(12) United States Patent
Yamada

(10) Patent No.: US 11,277,535 B2
(45) Date of Patent: Mar. 15, 2022

(54) IMAGE READING APPARATUS AND CONTROL APPARATUS FOR THE SAME

(71) Applicant: FUJIFILM Business Innovation Corp., Tokyo (JP)

(72) Inventor: Kenji Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/944,161

(22) Filed: Jul. 31, 2020

(65) Prior Publication Data
US 2021/0297544 A1    Sep. 23, 2021

(30) Foreign Application Priority Data

Mar. 17, 2020  (JP) .............................. JP2020-046870

(51) Int. Cl.
*H04N 1/04*  (2006.01)
*H04N 1/00*  (2006.01)

(52) U.S. Cl.
CPC ..... *H04N 1/00748* (2013.01); *H04N 1/00331* (2013.01); *H04N 1/00708* (2013.01); *H04N 1/00785* (2013.01)

(58) Field of Classification Search
CPC ........... H04N 1/00748; H04N 1/00331; H04N 1/00708; H04N 1/0071; H04N 1/00729; H04N 1/00785
See application file for complete search history.

(56) References Cited

U.S. PATENT DOCUMENTS

| | | | | |
|---|---|---|---|---|
| 2009/0296167 A1* | 12/2009 | Motoyama | ......... | H04N 1/00748 358/474 |
| 2011/0211235 A1* | 9/2011 | Osakabe | ................ | H04N 1/121 358/475 |
| 2013/0182296 A1* | 7/2013 | Masaki | .............. | H04N 1/00785 358/488 |
| 2014/0029064 A1* | 1/2014 | Jittou | ................... | H04N 1/3877 358/448 |

FOREIGN PATENT DOCUMENTS

JP    2012-222764    11/2012

* cited by examiner

*Primary Examiner* — Moustapha Diaby
(74) *Attorney, Agent, or Firm* — JCIPRNET

(57) ABSTRACT

An image reading apparatus includes a reading unit that reads a document transported in a second scan direction, a detector unit that detect a position of an edge of the document in a first scan direction crossing the second scan direction, a setting unit that sets a search range of the edge of the document in the first scan direction, the search range including the position of the edge detected by the detector unit, and a search unit that, on image data that the reading unit has read from the document, searches for the position of the edge within the search range of the edge set by the setting unit.

13 Claims, 9 Drawing Sheets

FIG. 5

| DOCUMENT SHEET SIZE | A3 | A4 | | A5 | | BUSINESS CARD (55 mm × 91 mm) | |
|---|---|---|---|---|---|---|---|
| ORIENTATION OF DOCUMENT | PORTRAIT | LANDSCAPE | PORTRAIT | LANDSCAPE | PORTRAIT | LANDSCAPE | PORTRAIT |
| FIRST SENSOR 21 | ON | ON | OFF | OFF | OFF | OFF | OFF |
| SECOND SENSOR 22 | ON | ON | ON | ON | OFF | OFF | OFF |
| THIRD SENSOR 23 | ON | ON | ON | ON | ON | ON | ON |

FIG. 8

| STATE | FIRST STATE | SECOND STATE | THIRD STATE |
|---|---|---|---|
| FIRST SENSOR 21 | ON | OFF | OFF |
| SECOND SENSOR 22 | ON | ON | OFF |
| THIRD SENSOR 23 | ON | ON | ON |
| DOCUMENT WIDTH W (mm) | 297 | 210 | 148 |
| DOCUMENT LEFT EDGE Ml (LEFT SEARCH RANGE Rl) | −148.5 (−153.5 TO −143.5) | −105 (−110.0 TO −100.0) | −74 (−79.0 TO −69.0) |
| DOCUMENT RIGHT EDGE Mr (RIGHT SEARCH RANGE Rr) | 148.5 (+143.5 TO +153.5) | 105 (+100.0 TO +110.0) | 74 (+69.0 TO +79.0) |

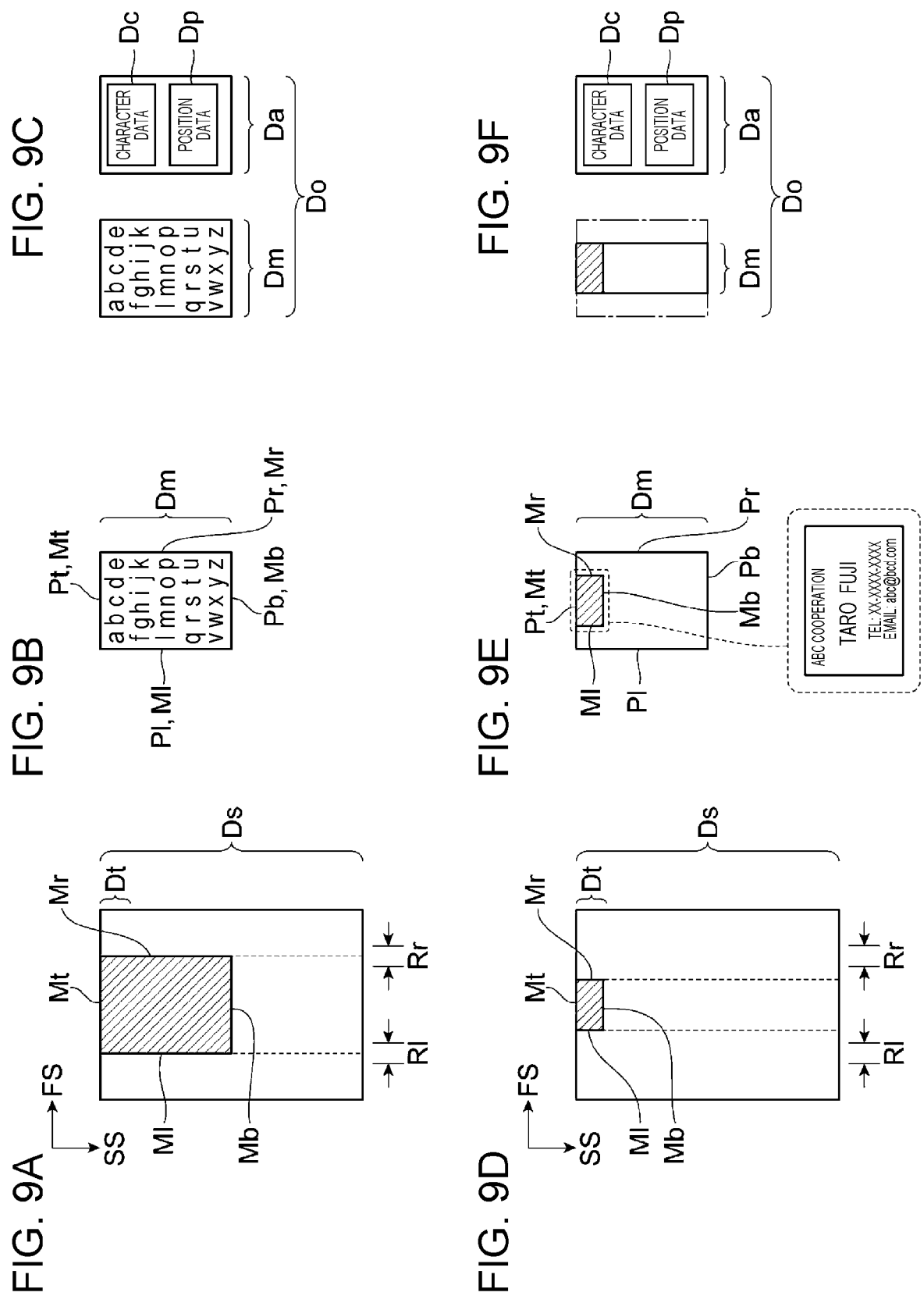

IMAGE READING APPARATUS AND CONTROL APPARATUS FOR THE SAME

CROSS-REFERENCE TO RELATED APPLICATIONS

This application is based on and claims priority under 35 USC 119 from Japanese Patent Application No. 2020-046870 filed Mar. 17, 2020.

BACKGROUND

(i) Technical Field

The present disclosure relates to an image reading apparatus and a control apparatus for the same.

(ii) Related Art

Japanese Unexamined Patent Application Publication No. 2012-222764 discloses an image processing apparatus that includes an optical sensor that determines the size of a document placed in a tray of an automatic document feeder and a scanner unit that reads through a charge-coupled device (CCD) the image of the document transported from the tray. According to Japanese Unexamined Patent Application Publication No. 2012-222764, if the size of the document detected in response to detection results of the optical sensor is determined to be not correct, a user is prompted to set an appropriate size.

If an edge of a document is detected in the whole range of a first scan direction on read image data that has been obtained by reading the document transported in a second scan direction, a streak that is attributed to a grain and contained in the read image data may be detected as the edge of the document.

SUMMARY

Aspects of non-limiting embodiments of the present disclosure relate to controlling erroneous detection of the position of an edge of a document in a first scan direction more than when the edge of the document is detected in a whole range of the document in the first scan direction on read image data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading apparatus. The image reading apparatus includes a reading unit that reads a document transported in a second scan direction, a detector unit that detect a position of an edge of the document in a first scan direction crossing the second scan direction, a setting unit that sets a search range of the edge of the document in the first scan direction, the search range including the position of the edge detected by the detector unit, and a search unit that, on image data that the reading unit has read from the document, searches for the position of the edge within the search range of the edge set by the setting unit.

BRIEF DESCRIPTION OF THE DRAWINGS

Exemplary embodiments of the present disclosure will be described in detail based on the following figures, wherein:

FIG. 5 illustrates a relationship of a size and orientation of the document placed in a document tray and on/off state of the document width sensor;

FIG. 8 illustrates a relationship of document width detection results and tentatively determined positions of the left edge and right edge of the document; and FIGS. 9A through 9F illustrate specific examples of a reading operation of the document.

DETAILED DESCRIPTION

Exemplary embodiment of the disclosure is described with reference to the drawings.

Image Processing System

Figure 1:
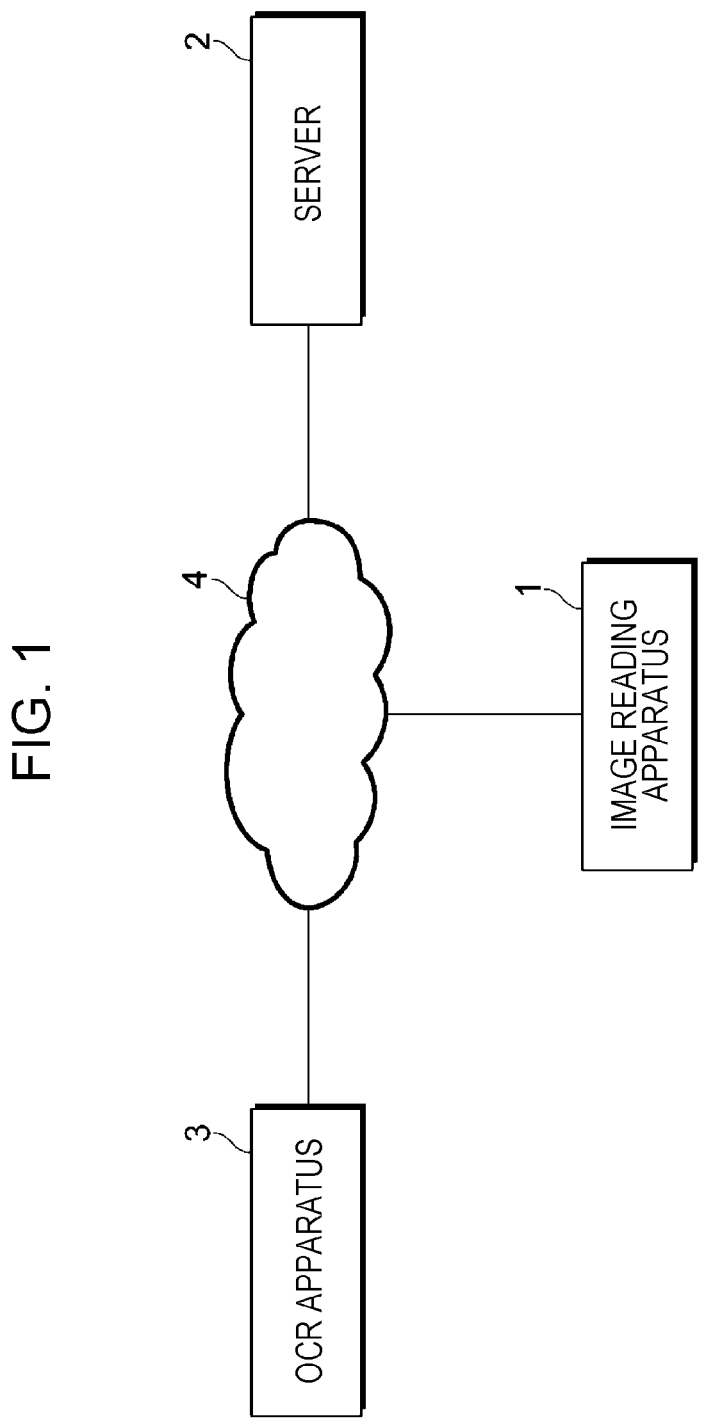
FIG. 1 illustrates a configuration of an image processing system of an exemplary embodiment of the disclosure.

FIG. 1 illustrates the configuration of an image processing system of the exemplary embodiment. Referring to FIG. 1, the image processing system includes an image reading apparatus 1, server 2, and optical character recognition/reader (OCR) apparatus 3 communicably interconnected to each other via a network 4.

The image reading apparatus 1 reads an image of a document. The server 2 stores image data being responsive to the image and transmitted from the image reading apparatus 1. In response to an instruction from the image reading apparatus 1, the OCR apparatus 3 performs an optical character recognition (OCR) operation on image data from the image reading apparatus 1 and then transmits resulting image data back to the image reading apparatus 1. The server 2 and OCR apparatus 3 may be implemented by a computer including a central processing unit (CPU) and memory.

Image Reading Apparatus

Figure 2:
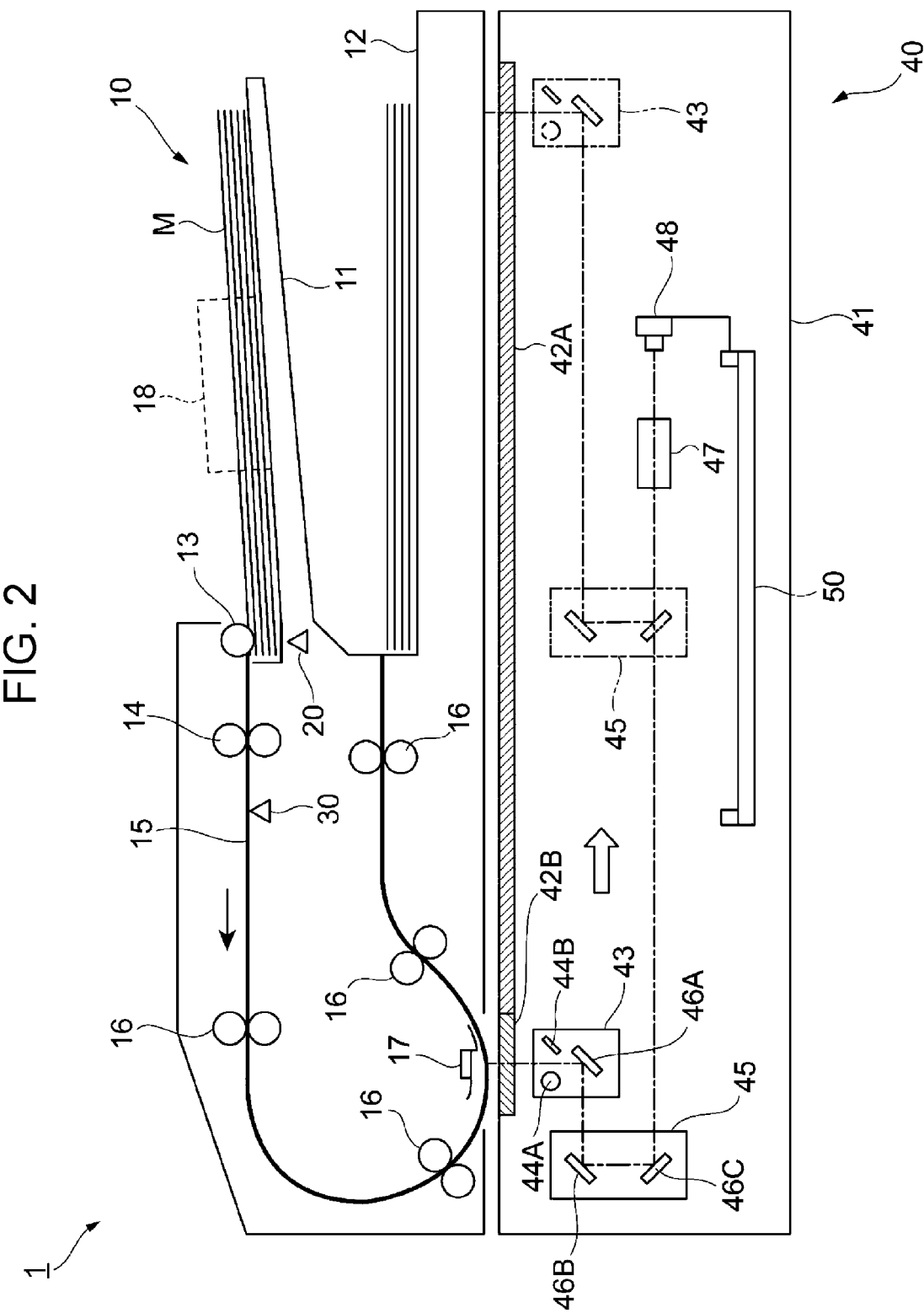
FIG. 2 illustrates a configuration of an image reading apparatus.

FIG. 2 illustrates the configuration of the image reading apparatus 1. The image reading apparatus 1 includes a document feeder 10 that successively transports a document M of a bundle of documents stacked and a scanner 40 that reads an image of the document through scanning.

Document Feeder

The document feeder 10 includes a document tray 11 in which a bundle of documents M is stacked and a discharge tray 12 that is arranged below the document tray 11 and receives the discharged documents M that have been read. The document feeder 10 further includes a pickup roller 13 that picks up and transports the document M from the document tray 11. A separating mechanism 14 is arranged downstream of the pickup roller 13 in a transport direction to separate one document M from another document M. Transport rollers 16 (for example, six pairs of transport rollers 16 in the exemplary embodiment) as an example of a transport medium are arranged along a transport path 15 of the document M.

A reflector 17 is mounted at a reading position. The reflector 17 is a white plate extending from front to rear in a direction perpendicular to the page of FIG. 2 and serves as the background of the document M that passes through the reading position. The reflector 17 serves as a reference white level for shading correction.

The document tray 11 serving as an example of a document platen includes a regulating members 18. The regulating members 18 regulates the positions of the documents M in a first scan direction by causing both edges of the documents M to engage with the document tray 11 in the width direction (first scan direction).

A document width detection sensors 20 is mounted at a location below the pickup roller 13 that is arranged at the leading edge portion of the documents M in the document tray 11. The document width detection sensors 20 detects the width (length in the first scan direction) of each document M stacked in the document tray 11.

A document length detection sensor 30 is mounted at a location in the transport path 15. The document length detection sensor 30 detects the length (length in the second scan direction) of each document M.

Scanner

The scanner 40 supports the document feeder 10 with an apparatus frame 41 in a manner such that the document feeder 10 is openable. The scanner 40 reads an image from each document M transported by the document feeder 10. The scanner 40 includes the apparatus frame 41, first platen glass 42A, and second platen glass 42B. The apparatus frame 41 serves as the casing of the scanner 40. The document M is placed in a stationary state on the first platen glass 42A. The second platen glass 42B is mounted downstream of the reflector 17 and serves as an opening through which light to read the document M transported by the document feeder 10 is output.

The scanner 40 includes a full-rate carriage 43 and half-rate carriage 45. Below the second platen glass 42B, the full-rate carriage 43 stands still or moves to scan the whole first platen glass 42A to read images. The half-rate carriage 45 supplies light from the full-rate carriage 43 to a focusing unit. The full-rate carriage 43 includes a light source device 44A (white light source), light source mirror 44B and a first mirror 46A. The light source device 44A radiates light onto the document M. The light source mirror 44B reflects the light from the light source device 44A to the document M. The first mirror 46A receives the light reflected from the document M. The half-rate carriage 45 includes a second mirror 46B and third mirror 46C to supply the light from the first mirror 46A to the focusing unit.

The scanner 40 further includes a focusing lens 47 and light receiving unit 48. The focusing lens 47 optically focuses an optical image from the third mirror 46C. The light receiving unit 48 photoelectrically converts the optical image focused by the focusing lens 47. Specifically, the scanner 40 focuses an image on the light receiving unit 48 using optical reduction system. In accordance with the exemplary embodiment, the light receiving unit 48 includes image elements. In the light receiving unit 48, columns of imaging elements for red, green, and blue colors are arranged the first scan direction are then arranged in the second scan direction. The image of the document M is thus read as a full-color image using the light receiving unit 48 as an example of a reading unit.

The scanner 40 further includes a control and image processing unit 50. The control and image processing unit 50 performs a variety of image processing processes on the image data on the document M input from the light receiving unit 48. The control and image processing unit 50 controls the operation of each element in the image reading apparatus 1 in image reading.

Both the full-rate carriage 43 and the half-rate carriage 45 move in the direction denoted by an arrow at a rate of 2:1 in a fixed reading mode. In the fixed reading mode, an image is read from the document M placed on the first platen glass 42A. In this case, light from the light source device 44A in the full-rate carriage 43 is radiated onto a reading surface of the document M. The light reflected from the document M is then reflected off the first mirror 46A, the second mirror 46B, and the third mirror 46C in this order and then guided to the focusing lens 47. The light guided to the focusing lens 47 is focused on the light incident surface of the light receiving unit 48. The column of imaging elements for the colors forming the light receiving unit 48 is a one-dimensional sensor and concurrently processes one line of light rays. In the direction (the second scan direction for reading) crossing the direction of the line (the first scan direction for reading), the full-rate carriage 43 and the half-rate carriage 45 are moved, thereby reading the next one line of the document M. One page of the document M is completed by performing the reading over the entire document M.

In a transport and read mode, an image is read from the document M that is being transported by the document feeder 10. In the transport and read mode, the document M transported in the second scan direction passes over the second platen glass 42B. The full-rate carriage 43 and the half-rate carriage 45 are set to be in a stand-still state at the location where the full-rate carriage 43 and the half-rate carriage 45 are drawn in solid line as illustrated in FIG. 1. The light beam reflected from one line of the document M is focused through the focusing lens 47 after being reflected off the first mirror 46A, second mirror 46B, and third mirror 46C. The resulting image is read by the light receiving unit 48. In other words, after one line of the document M in the first scan direction is processed by the light receiving unit 48, next line of the document M transported by the document feeder 10 is read in the first scan direction. After the leading edge of the document M passes through the reading position of the second platen glass 42B, the trailing edge of the document M passes through the reading position on the second platen glass 42B. Reading one page of the document M in the second scan direction is complete by successively reading the document M line by line in the first scan direction.

Document

Figure 3:
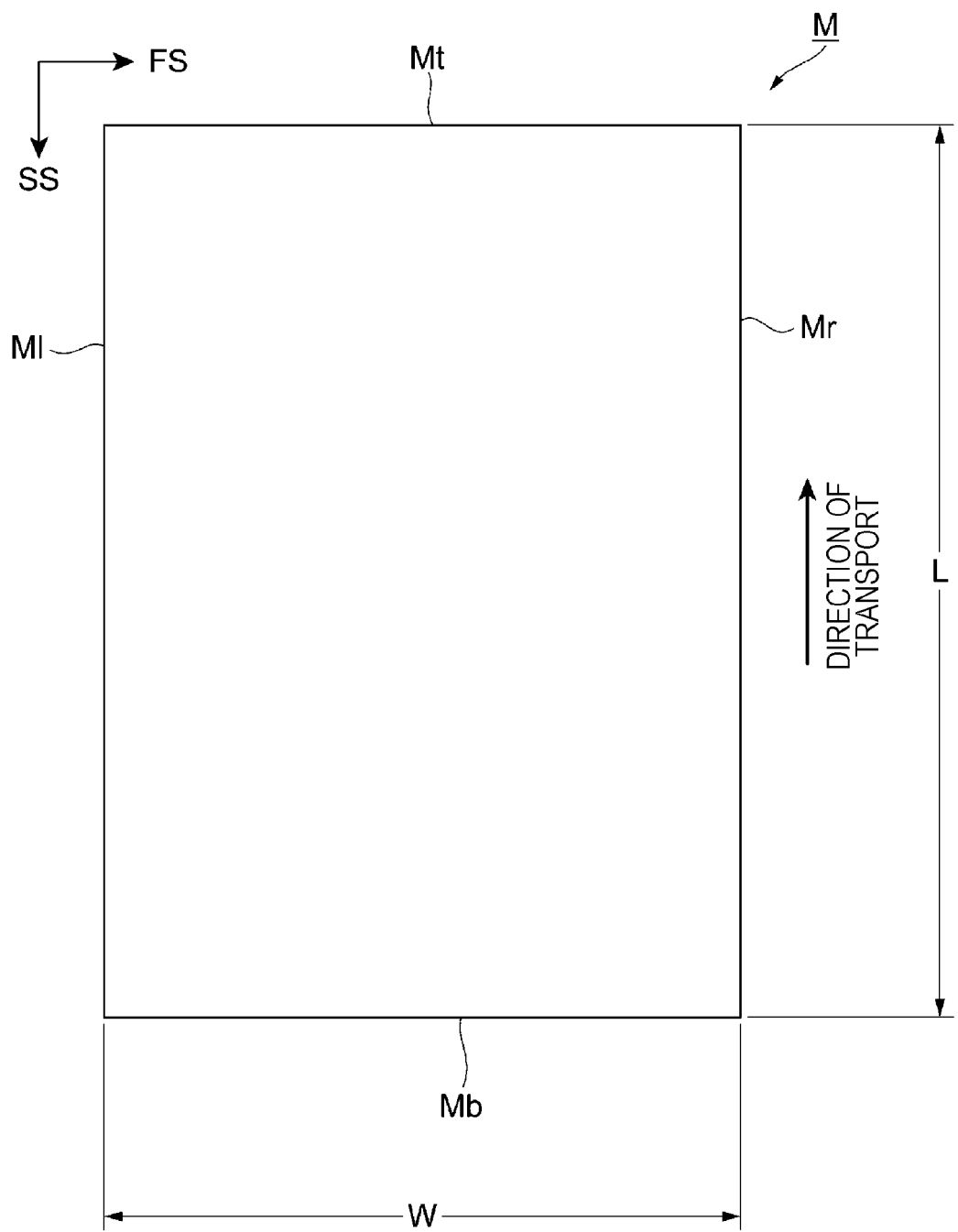
FIG. 3 illustrates a document as a reading target.

FIG. 3 illustrates the document M serving as a reading target of the image reading apparatus 1 in FIG. 1. Referring to FIG. 3, the document M is rectangular with the shorter side thereof aligned with a first scan direction FS and the longer side thereof aligned with a second scan direction SS. It is also possible that the longer side of the document M is aligned with the first scan direction FS and the shorter side of the document M is aligned with the second scan direction SS. In the discussion that follows, the former orientation is referred to as "portrait" orientation, and the latter orientation is referred to as "landscape" orientation. Also, the leading side of the document M in the second scan direction SS is referred to as a document leading edge Mt and the trailing side of the document M in the second scan direction SS is referred to as a document trailing edge Mb. The left side of the reading surface of the document M (the surface looking toward the reader) is referred to as a document left edge Ml and the right side of the reading surface of the document M is referred to as a document right edge Mr. The length of the document M in the second scan direction SS (transport direction) is referred to as a document length L and the length of the document M in the first scan direction FS is referred to a document width W. The relationship of the document length L>the document width W holds in the portrait orientation and the relationship of the document length L<the document width W holds in the landscape orientation.

Document Width Detection Sensor

Figure 4:
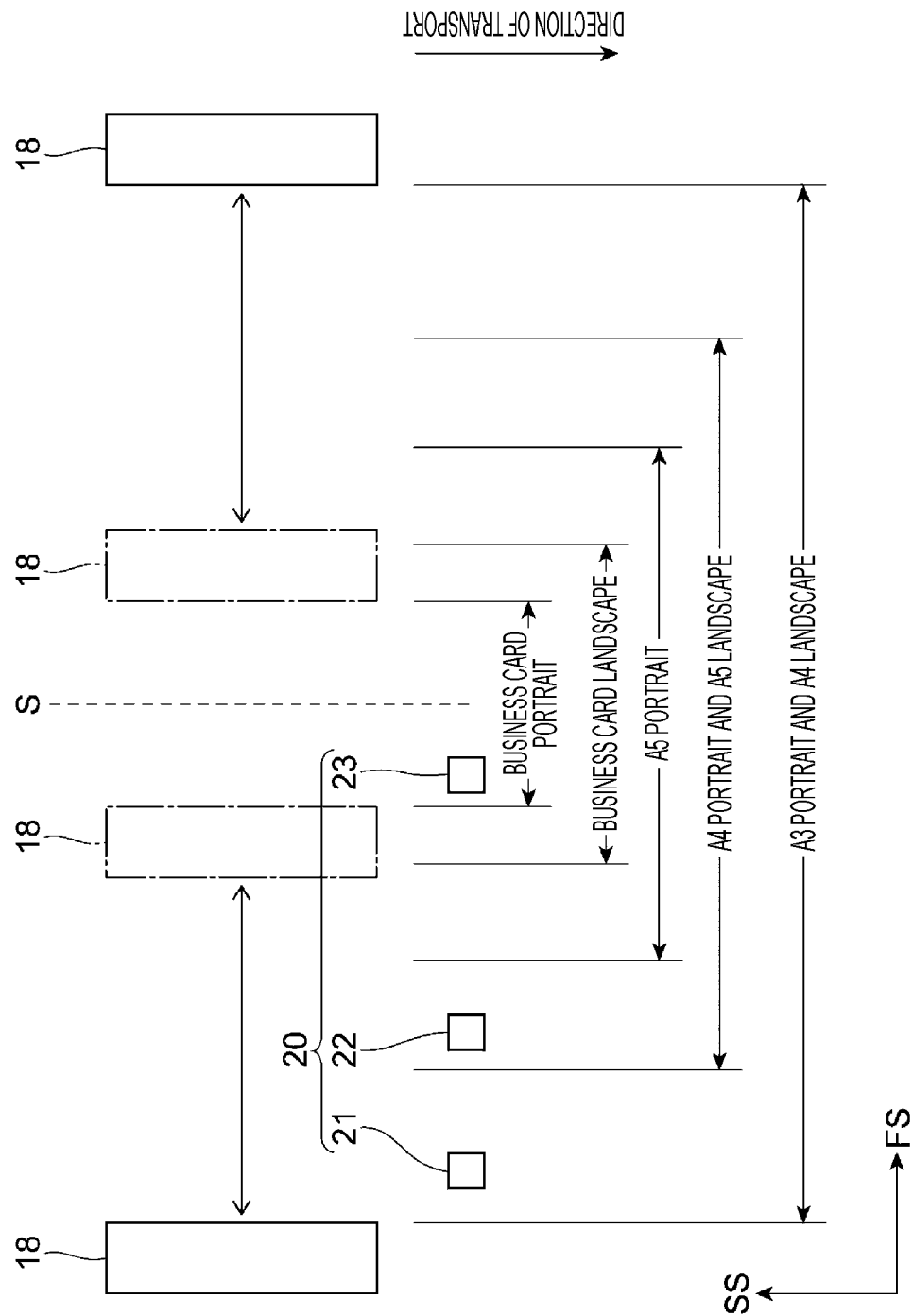
FIG. 4 illustrates a mounting location of a document width sensor.

FIG. 4 illustrates the mounting location of the document width detection sensors 20. FIG. 4 also illustrates the relationship of the regulating members 18 with the sizes of variety of documents M stacked in the document tray 11.

The image reading apparatus 1 of the exemplary embodiment transports the document M in a center registration method with reference to a reference line S aligned at the center of the document M in the first scan direction. The regulating members 18 of the exemplary embodiment are symmetrically mounted with respect to the reference line S in the first scan direction FS and are shifted in concert with each other in the first scan direction FS.

In the transport and read mode, the image reading apparatus 1 of the exemplary embodiment may transport and read the documents M in a variety of sizes and orientations from "name card portrait (oriented)" to "A3 (sheet size) portrait (oriented) and A4 (sheet size) portrait (oriented)". Specifically, in the transport and read mode, the image reading apparatus 1 may read the documents M of five types of document width W ("name card portrait", "name card landscape (oriented)", "A5 (sheet size) portrait", "A4 portrait and A5 landscape (oriented)", and "A3 portrait and A4 landscape"). In terms of types of the documents M, the image reading apparatus 1 may read one of four types of the documents M ("name card", "A5", "A4", and "A3"). In accordance with the exemplary embodiment, the size of the name card is 91 mm×55 mm (this size is occasionally referred to as Tokyo No. 4).

The document width W of the document M A3 portrait and the document M of A4 landscape is 297 mm. The document width W of the document M of A4 portrait and the document M of A5 landscape is 210 mm. The document width W of the document M of A5 portrait is 148 mm. The document width W of the document M of name card landscape is 91 mm. The document width W of the document M of name card portrait is 55 mm.

The document width detection sensors 20 serving as an example of a detector unit or a selection unit include a first sensor 21, second sensor 22, and third sensor 23 mounted along the first scan direction FS. Specifically, in the center registration method with the reference line S, the first sensor 21 is arranged at the outermost location from the reference line S, the third sensor 23 is arranged at the innermost location to the reference line S, and the second sensor 22 is arranged between the first sensor 21 and the third sensor 23. The first sensor 21 is arranged at the location where the documents M of A3 portrait and A4 landscape are detectable but the documents M of A4 portrait and A5 landscape, A5 portrait, name card landscape, and name card portrait are not detectable. The second sensor 22 is arranged at the location where the documents M of A3 portrait and A4 landscape and the documents M of A4 portrait and A5 landscape are detectable but the documents M of A5 portrait, name card landscape, and name card portrait are not detectable. The third sensor 23 is arranged at the location where the documents M of all the sizes readable in the transport and read mode (A3 portrait and A4 landscape, A4 portrait and A5 landscape, A5 portrait, name card landscape, and name card portrait) are detectable.

FIG. 5 illustrates a relationship of a size and orientation of the document placed in the document tray 11 and on/off state of the document width sensor. The relationship between the size and orientation of the document M readable in the transport and read mode and the output of the document width detection sensors 20 is described with reference to FIGS. 4 and 5.

If the document M of A3 portrait or A4 landscape (the document width W of each document M is 297 mm) is placed in the document tray 11, all of the first sensor 21, second sensor 22, and third sensor 23 are set to on. This state is referred to as a "first state" in the following discussion. If the document M of A4 portrait or A5 landscape (the document width W of each document M is 210 mm) is placed in the document tray 11, the second sensor 22 and third sensor 23 are set to on and the first sensor 21 is set to off. This state is referred to as a "second state" in the following discussion. If the document M of A5 portrait, name card landscape, or name card portrait is placed in the document tray 11, the third sensor 23 is set to on and the first sensor 21 and second sensor 22 are set to off. This state is referred to as a "third state" in the following discussion.

The document M of A5 portrait has a document width of 148 mm, the document M of name card landscape has a document width of 91 mm, and the document M of name card portrait has a document width of 55 mm. If the detection results of the document width detection sensors 20 are the first state or the second state, the document width W placed in the document tray 11 is uniquely determined. Specifically, the document width W is determined to be 297 mm in the first state and the document width W is determined to be 210 mm in the second state. If the detection results of the document width detection sensors 20 are the third state, the document width W of the document M placed in the document tray 11 is not uniquely determined. In the case of the third state, the document width W may be possibly 148 mm, 91 mm, or 55 mm. In other words, the occurrence of the third state is not sufficient enough to determine the document width W of the document M.

Control and Image Processing Unit

Figure 6:
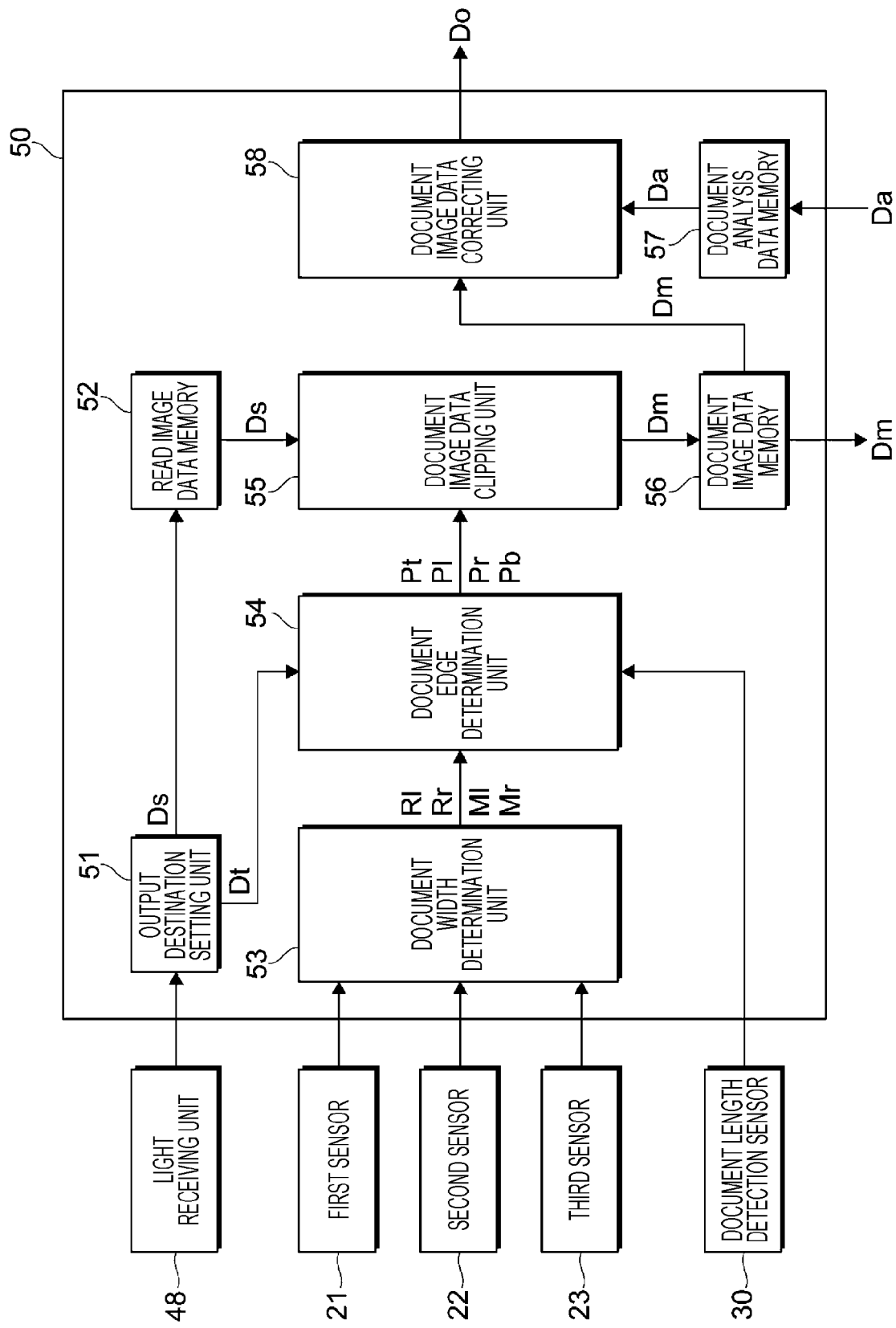
FIG. 6 illustrates a functional configuration of a control and image processing unit.

FIG. 6 illustrates the functional configuration of the control and image processing unit 50. FIG. 6 illustrates only the functional configuration related to the image processing of the image reading apparatus 1 and does not illustrate the functional configuration related to controlling of an image reading process of the image reading apparatus 1.

The control and image processing unit 50 includes an output destination setting unit 51, read image data memory 52, document width determination unit 53, document edge determination unit 54, document image data clipping unit 55, document image data memory 56, document analysis data memory 57, and document image data correcting unit 58. These elements forming the control and image processing unit 50 are described below.

The output destination setting unit 51 receives reading results of the document M from the light receiving unit 48 sequentially line by line in the first scan direction FS. The output destination setting unit 51 outputs data on the leading edge of the document M in the transport direction to the read image data memory 52 and document edge determination unit 54 and data on the trailing edge of the same document M in the transport direction to the document edge determination unit 54. As a result, the output destination setting unit 51 outputs to the read image data memory 52 read image data Ds for a sheet (page) of the document M including total lines of reading results in the first scan direction FS. Also, he output destination setting unit 51 outputs to the document edge determination unit 54 leading edge image data Dt that is a set of lines (less than one page) from the reading results of each line in the first scan direction FS. As described in detail below, the actual read image data Ds includes, in addition to the reading results of one page of the document M, reading results from an area outside the edges of the document M (the document leading edge Mt, the document left edge Ml, the document right edge Mr, and the document trailing edge Mb). The read image data Ds of the exemplary embodiment is obtained from reading a target area larger in size than a single document M.

The read image data memory 52 includes a memory, such as a random-access memory (RAM), and receives and stores the read image data Ds transmitted from the output destination setting unit 51. In response to a request from the document image data clipping unit 55, the read image data memory 52 outputs the read image data Ds therefrom to the document image data clipping unit 55.

The document width determination unit 53 serving as a setting unit receives detection results of the document M from the first sensor 21, second sensor 22, and third sensor 23 in the document width detection sensors 20. In response to the received detection results, the document width determination unit 53 tentatively determines the document left edge Ml and document right edge Mr of the document M. In response to the tentatively determined document left edge Ml, the document width determination unit 53 tentatively determines a left search range Rl containing the document left edge Ml. In response to the tentatively determined document right edge Mr, the document width determination unit 53 tentatively determines a right search range Rr containing the document right edge Mr. The document width determination unit 53 outputs to the document edge determination unit 54 the document left edge Ml, document right edge Mr, left search range Rl, and right search range Rr, all tentatively determined by the document width determination unit 53. In accordance with the exemplary embodiment, the left search range Rl and right search range Rr are a search range of an edge. The left search range Rl is an example of a first search range and the right search range Rr is an example of a second search range.

The document edge determination unit 54 serving as an example of a search unit receives the leading edge image data Dt transmitted from the output destination setting unit 51. The document edge determination unit 54 also receives from the document width determination unit 53 the document left edge Ml, document right edge Mr, left search range Rl, and right search range Rr. The document edge determination unit 54 further receives the detection results of the document M from the document length detection sensor 30. In response to the received data, the document edge determination unit 54 tentatively associates the position of each edge of the document M serving as a reading target with the position of each edge of the document M in the read image data Ds that is the reading results of the document M. Specifically, in response to the received data, the document edge determination unit 54 tentatively determines, in the read image data Ds, a leading edge position Pt corresponding to the document leading edge Mt, a left edge position Pl corresponding to the document left edge Ml, a right edge position Pr corresponding to the document right edge Mr, and a trailing edge position Pb corresponding to the document trailing edge Mb. The document edge determination unit 54 then outputs the tentatively determined leading edge position Pt, left edge position Pl, right edge position Pr, and trailing edge position Pb. In accordance with the exemplary embodiment, the left edge position Pl and the right edge position Pr are examples of edges. The left edge position P is an example of a position of a first edge and the right edge position Pr is an example of a position of a second edge.

The document image data clipping unit 55 serving as a clipping unit receives the read image data Ds transmitted from the read image data memory 52. The document image data clipping unit 55 also receives from the document edge determination unit 54 the leading edge position Pt, left edge position Pl, right edge position Pr, and trailing edge position Pb. In response to the received data, the document image data clipping unit 55 discriminates the area obtained as a result of reading the document M in the read image data Ds from the area (specifically the reflector 17) obtained as a result of reading an area other than the document M. The document image data clipping unit 55 thus extracts and outputs data corresponding to the reading results of the document M. Specifically, the document image data clipping unit 55 performs a clipping operation on the read image data Ds in accordance with the leading edge position Pt, left edge position Pl, right edge position Pr, and trailing edge position Pb and outputs resulting document image data Dm to the document image data memory 56.

The document image data memory 56 receives and stores the document image data Dm from the document image data clipping unit 55. The document image data memory 56 outputs as appropriate the document image data Dm stored thereon to an external apparatus (such as the OCR apparatus 3). In response to a request from the document image data correcting unit 58, the document image data memory 56 outputs the document image data Dm stored thereon to the document image data correcting unit 58.

The document analysis data memory 57 receives from the external apparatus (for example, the OCR apparatus 3) document analysis data Da that has been obtained by performing an optical character recognition (OCR) operation on the document image data Dm and stores the document analysis data Da. In response to a request from the document image data correcting unit 58, the document analysis data memory 57 outputs the document analysis data Da stored thereon to the document image data correcting unit 58. In accordance with the exemplary embodiment, the document analysis data Da is an example of optical character recognition data.

The document image data correcting unit 58 receives the document image data Dm from the document image data memory 56. The document image data correcting unit 58 also receives from the document analysis data memory 57 the document analysis data Da that has been obtained by analyzing the same document M from which the document image data Dm is also derived. The document image data correcting unit 58 corrects as appropriate the received document image data Dm in terms of the edge position of the document M based on the document analysis data Da. The document image data correcting unit 58 may not necessarily have to correct the document image data Dm. The document image data correcting unit 58 outputs to an external apparatus (for example, the server 2) output data Do (=the document image data Dm+the document analysis data Da) that is constructed by associating the corrected or uncorrected document image data Dm with the document analysis data Da.

Image Processing Process in Transport and Read Mode

Figure 7:
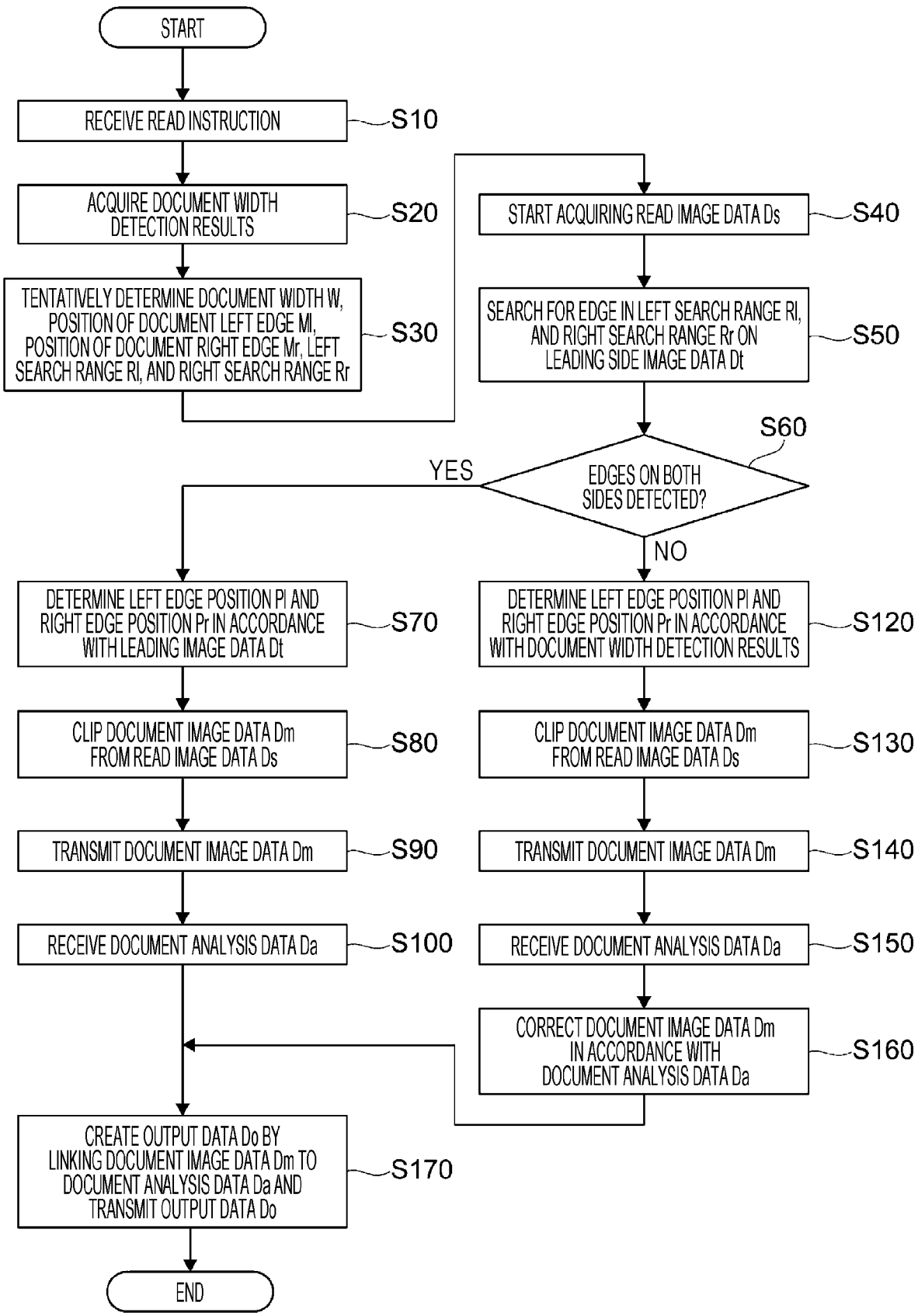
FIG. 7 is a flowchart illustrating an image processing process in a transport and read mode.

FIG. 7 is a flowchart illustrating an image processing process in the transport and read mode. It is assumed that a document M having a specific size (name card, A5, A4, or A3) in a portrait or landscape orientation is stacked in the document tray 11 in the image reading apparatus 1. It is noted that the sheet size A3 may be stacked only in the portrait orientation.

The image reading apparatus 1 receives a read instruction from the user in the transport and read mode (step S10). The document width determination unit 53 acquires document width detection results as detection results of the document M by the first sensor 21 through the third sensor 23 (step S20). In response to the acquired document width detection results, the document width determination unit 53 tentatively determines the document width W of the document M placed in the document tray 11. The document width determination unit 53 also tentatively determines the position of the document left edge Ml, the position of the document right edge Mr, the left search range Rl containing the position of the document left edge Ml, and the right search range Rr containing the position of the document right edge Mr of the document M (step S30).

A transport operation of the document M placed in the document tray 11 starts and a reading operation of the document M using the light receiving unit 48 also starts as well. The document M is transported in the center registration method with the reference line S aligned with the center of the document M in the first scan direction FS. The output destination setting unit 51 starts acquiring the reading results of the light receiving unit 48. Specifically, the output destination setting unit 51 starts acquiring the read image data Ds related to the document M being transported (step S40). The output destination setting unit 51 outputs data to the read image data memory 52 and document edge determination unit 54 in parallel. As a result, the read image data Ds is output to the read image data memory 52 and the leading edge image data Dt is output to the document edge determination unit 54. The outputting of the read image data Ds to the read image data memory 52 is complete after the outputting of the leading edge image data Dt to the document edge determination unit 54 is complete. The read image data memory 52 thus stores the incoming read image data Ds.

The document edge determination unit 54 searches the leading edge image data Dt of the document M received from the output destination setting unit 51 for edges in the left search range Rl and right search range Rr tentatively determined in step S30 (step S50). Specifically, the document edge determination unit 54 searches the leading edge image data Dt for the left edge position Pl corresponding to the document left edge Ml within the left search range Rl and for the right edge position Pr corresponding to the document right edge Mr within the right search range Rr.

The document edge determination unit 54 determines whether both edges have been detected (step S60). Specifically, the document edge determination unit 54 determines whether the left edge position Pl and the right edge position Pr have been detected on the leading edge image data Dt. The detection of the left edge position Pl in the first scan direction FS is performed depending on whether a straight streak extending in the second scan direction SS is present within the left search range Rl. The detection of the right edge position Pr in the first scan direction FS is performed depending whether a straight steak extending in the second scan direction SS is present within the right search range Rr.

In step S50, the document edge determination unit 54 has acquired the document length determination results as the detection results of the document M by the document length detection sensor 30. In response to the acquired document length detection results, the document edge determination unit 54 determines the document length L, document leading edge Mt and document trailing edge Mb of the document M being transported and read.

If the yes path is followed in step S60, the document edge determination unit 54 determines the left edge position Pl and the right edge position Pr in accordance with the leading edge image data Dt (step S70). The document edge determination unit 54 determines, as the left edge position Pl and right edge position Pr, both edges in the first scan direction FS found in the leading edge image data Dt as the light receiving results of the light receiving unit 48.

The document image data clipping unit 55 extracts, from the read image data Ds read from the read image data memory 52, data within the borders defined by the leading edge position Pt, left edge position Pl, right edge position Pr, and trailing edge position Pb, determined by the document edge determination unit 54. In other words, the document image data clipping unit 55 clips the document image data Dm from the read image data Ds in accordance with the edge position information (step S80). The document image data Dm thus clipped is stored on the document image data memory 56. The document image data Dm is then read from the document image data memory 56 and transmitted to the OCR apparatus 3 via the network 4 (step S90).

The OCR apparatus 3 performs a related-art OCR operation on the received document image data Dm. The OCR apparatus 3 of the exemplary embodiment creates the document analysis data Da by performing the OCR operation on the document image data Dm. The document analysis data Da includes character data Dc of multiple characters (character code) and Dp position data on the positions of the characters (see FIGS. 9C and 9F). The OCR apparatus 3 transmits (returns) the document analysis data Da to the image reading apparatus 1 via the network 4.

The image reading apparatus 1 receives the document analysis data Da (step S100) and the document analysis data memory 57 stores the received document analysis data Da. The document image data correcting unit 58 creates the output data Do by linking the document image data Dm obtained from a common (same) document M and read from the document image data memory 56 and the document analysis data Da obtained from the common document M and read from the document analysis data memory 57. The document image data correcting unit 58 then transmits the output data Do to the server 2 via the network 4 (step S170). If the yes path is followed in step S60, the document image data correcting unit 58 outputs the document image data Dm as is without any particular correction performed thereon.

If no path is followed in step S60, the document edge determination unit 54 determines the left edge position Pl and right edge position Pr in accordance with the document width detection results obtained in step S20 rather than the leading edge image data Dt (step S120). In other words, the document edge determination unit 54 determines the left edge position Pl and right edge position Pr in the leading edge image data Dt in accordance with the detection results of the document width detection sensors 20 (the first sensor 21, second sensor 22, and third sensor 23) rather than the reading results of the document M.

The document image data clipping unit 55 extracts, from the read image data Ds read from the read image data memory 52, data within the borders defined by the leading edge position Pt, left edge position Pl, right edge position Pr, and trailing edge position Pb, determined by the document edge determination unit 54. In other words, the document image data clipping unit 55 clips the document image data Dm from the read image data Ds in accordance with the edge positions (step S130). The document image data Dm thus clipped is stored on the document image data memory 56. The document image data Dm is then read from the document image data memory 56 and transmitted to the OCR apparatus 3 via the network 4 (step S140).

The image reading apparatus 1 receives the document analysis data Da from the OCR apparatus 3 (step S150). The received document analysis data Da is stored on the document analysis data memory 57. The document image data correcting unit 58 corrects the document image data Dm read from the document image data memory 56 in accordance with the document analysis data Da read from the document analysis data memory 57. Specifically, the document image data correcting unit 58 clips again a portion of the document image data Dm related to each edge (in particular related to the left edge position Pl and right edge position Pr) in accordance with position data Dp forming the document analysis data Da. The document image data correcting unit 58 creates the output data Do by linking the document image data Dm that read from the document image data memory 56 and corrected by the document image data correcting unit 58 with the document analysis data Da read from the document analysis data memory 57. The document image data correcting unit 58 then transmits the output data Do to the server 2 via the network 4 (step S170). The server 2 receives and stores the output data Do.

Specific Examples

Image processing process in the transport and read mode is specifically described below. FIG. 8 illustrates a relationship of document width detection results acquired in step S20 and positions of the document left edge Ml and document right edge Mr tentatively determined in step S30. FIG. 8 also illustrate in parentheses the left search range Rl determined in accordance with the document left edge Ml and the right search range Rr determined in accordance with the document right edge Mr.

First State

In a first state in which the first sensor 21, second sensor 22, and third sensor 23 are all on, the document width determination unit 53 tentatively determines that the document width W of the document M serving as a reading target in the document tray 11 is 297 mm.

The document width determination unit 53 then tentatively determines that the document left edge Ml of the document M is −148.5 mm and the document right edge Mr of the document M is +148.5 mm.

The document width determination unit 53 tentatively determines that the left search range Rl with respect to the document left edge Ml is the document left edge Ml±5 mm, in other words, −153.5 mm to −143.5 mm and that the right search range Rr with reference to the document right edge Mr is the document right edge Mr±5 mm, in other words, +143.5 mm to +153.5 mm.

The document M is transported in the center registration method. The positions (coordinates in the first scan direction FS) of the document left edge Ml and document right edge Mr are obtained by bisecting the document width W of the document M with respect to the reference line S as the origin in the first scan direction FS. In this example, the left search range Rl is set to the document left edge Ml±5 mm and the right search range Rr is set to the document right edge Mr±5 mm, but the size of each range is not limited to 5 mm. The range may be different in size from the positive direction to the negative direction, for example, +10 mm in the positive direction and −5 mm in the negative direction from the origin. The same is true of the second and third states.

Second State

In the second state in which the first sensor 21 is off and the second sensor 22 and third sensor 23 are on, the document width determination unit 53 tentatively determines that the document width W of the document M placed in the document tray 11 and serving as a reading target is 210 mm.

The document width determination unit 53 then tentatively determines that the document left edge Ml of the document M is −105 mm and the document right edge Mr of the document M is +105 mm.

The document width determination unit 53 tentatively determines that the left search range Rl containing the document left edge Ml is the document left edge Ml ±5 mm, namely, −110.0 mm to −100.0 mm and the right search range Rr containing the document right edge Mr is the document right edge Mr ±5 mm, namely, +100.0 mm to +110.0 mm.

Third State

In the third state in which the first sensor 21 and second sensor 22 are off and the third sensor 23 is on, the document width determination unit 53 tentatively determines that the document width W of the document M placed in the document tray 11 and serving as a reading target is 148 mm.

The document width determination unit 53 then tentatively determines that the document left edge Ml of the document M is −74 mm and the document right edge Mr of the document M is +74 mm.

The document width determination unit 53 tentatively determines that the left search range Rl containing the document left edge Ml is the document left edge Ml ±5 mm, namely, −79.0 mm to −69.0 mm and the right search range Rr containing the document right edge Mr is the document right edge Mr ±5 mm, namely, +69.0 mm to +79.0 mm.

If the first or second state is detected, the actual document width W of the document M substantially matches the document width W tentatively determined in step S20. The yes path is thus followed in step S60 and operations in steps S70 through S100 and S170 are sequentially performed.

If the third state is detected, the actual document width W of the document M substantially matches the document width W tentatively determined in step S20 (the document M is A5 portrait) or the actual document width W of the document M does not match the document width W tentatively determined in step S20 (the document M is name card landscape or name card portrait). If the actual document width W of the document M may substantially match the document width W tentatively determined in step S20, the yes path is followed in step S60 and then operations in steps S70 through S100 and S170 are sequentially performed. In contrast, if the actual document width W of the document M does not match the document width W tentatively determined in step S20, the no path is followed in step S60 and operations in steps S120 through S170 are performed sequentially.

The third state includes first and second cases. In the first case, the document M is A5 portrait. In the second case, the document M is name card landscape. The first and second cases are specifically described below.

First Case

The first case (A5 portrait with the yes path in step S60) is described first.

FIGS. 9A through 9C describe the first case. FIG. 9A illustrates the relationship of the read image data Ds, leading edge image data Dt, left search range Rl, right search range Rr, document leading edge Mt, document trailing edge Mb, document left edge Ml, and document right edge Mr. FIG. 9B illustrates the relationship of the document image data Dm, document leading edge Mt, document trailing edge Mb, document left edge Ml, document right edge Mr, leading edge position Pt, trailing edge position Pb, left edge position Pl, and right edge position Pr. FIG. 9C illustrates the relationship of the document image data Dm and document analysis data Da, forming the output data Do. FIG. 9C also illustrates the relationship of the character data Dc and position data Dp, forming the document analysis data Da.

In the case of the document M of A5 portrait, the document left edge Ml and the document right edge Mr are respectively present within the left search range Rl and the right search range Rr, tentatively determined based on the detection results of the document width detection sensors 20 (see FIG. 9A). The yes path is thus followed in step S60. The document leading edge Mt and document trailing edge Mb are determined in accordance with the detection results of the document length detection sensor 30.

The left edge position Pl and right edge position Pr are respectively determined from the document left edge Ml and the document right edge Mr in accordance with the leading edge image data Dt that is the reading results of the leading edge of the document M by the light receiving unit 48 (step S70). Also, the leading edge position Pt is determined from the document leading edge Mt and the trailing edge position Pb is determined from the document trailing edge Mb. In the first case, the document leading edge Mt matches the leading edge position Pt, the document trailing edge Mb matches the trailing edge position Pb, the document left edge Ml matches the left edge position Pl, and the document right edge Mr matches the right edge position Pr. In the first case, all edges agree with the respective positions.

The read image data Ds as the reading results of the whole document M is clipped at the leading edge position Pt, the trailing edge position Pb, the left edge position Pl, and the right edge position Pr (see step S80 and FIG. 9B). Characters (abcde fghij klmno pqrst uvwxy) are arranged on a reading surface of the document M of A5 portrait.

The document image data Dm is transmitted to the OCR apparatus 3 (step S90) and the document analysis data Da as the OCR results obtained from the document image data Dm is received from the OCR apparatus 3 (step S100). The document analysis data Da includes character data Dc on the above character strings and the position data Dp that is data on the positions of the character strings (see FIG. 9C).

In the first case, the output data Do (see FIG. 9C) that is formed by linking the document analysis data Da with the uncorrected document image data Dm in FIG. 9B is transmitted in step S170 to the server 2. The series of operations is thus complete.

Second Case

The second case (name card landscape with no path in step S60) is described below.

FIGS. 9D through 9F describe the second case. FIG. 9D illustrates the relationship of the read image data Ds, leading edge image data Dt, left search range Rl, right search range Rr, document leading edge Mt, document trailing edge Mb, document left edge Ml, and document right edge Mr. FIG. 9E illustrates the relationship of the document image data Dm, document leading edge Mt, document trailing edge Mb, document left edge Ml, document right edge Mr, leading edge position Pt, trailing edge position Pb, left edge position Pl, and right edge position Pr. FIG. 9F illustrates the relationship of the document image data Dm and document analysis data Da, forming the output data Do. FIG. 9F also illustrates the relationship of the character data Dc and position data Dp, forming the document analysis data Da.

If the document M is name card portrait, the document left edge Ml is not present within the left search range Rl tentatively determined based on the detection results of the document width detection sensors 20 and the document right edge Mr is not present within the right search range Rr tentatively determined based on the detection results of the document width detection sensors 20 (see FIG. 9D). The no path is thus followed in step S60. The document leading edge Mt and document trailing edge Mb are determined in accordance with the detection results of the document length detection sensor 30.

The left edge position Pl and right edge position Pr are determined in accordance with the document width detection results that are detection results of the document M provided by the document width detection sensors 20 (step S120). Specifically, the document width W of the document M of A5 portrait is wider than the actual document M (name card portrait). The left edge position Pl is determined from the document left edge Ml of the document M of A5 portrait and the right edge position Pr is determined from the document right edge Mr of the document M of A5 portrait. In this case, the left edge position Pl is located more leftward (more outer) than the document left edge Ml of the actual document M (name card landscape) and the right edge position Pr is located more rightward (more outer) than the document right edge Mr of the actual document M (of name card landscape) (see FIG. 9E). The leading edge position Pt and trailing edge position Pb are determined in accordance with the A5 portrait. In the second case, the document leading edge Mt matches the leading edge position Pt but the document trailing edge Mb does not match the trailing edge position Pb, the document left edge Ml does not match the left edge position Pl, and the document right edge Mr does not match the right edge position Pr. In the second case, one edge matches the corresponding edge position but the remaining three edges fail to match the corresponding edge positions.

The read image data Ds as the reading results of the whole document M is clipped along the leading edge position Pt, trailing edge position Pb, left edge position Pl, and right edge position Pr (see step S130 and FIG. 9E). The read image data Ds that is obtained by reading an area wider than the document M is thus processed into the document image data Dm for a smaller size. In this example, characters (ABC Corporation Taro Fuji Telephone No. Email Address) are written on the reading surface of the document M of the name card portrait. Since the area of the document image data Dm is substantially larger than the area of the actual document M in the second case, the document image data Dm with the read image data Ds clipped has still a wide blank area.

The document image data Dm is transmitted to the OCR apparatus 3 (step S140). The document analysis data Da that is the OCR results of the document image data Dm is received from the OCR apparatus 3 (step S150). The document analysis data Da includes the character data Dc of the character strings and the position data Dp on the positions of the character strings (see FIG. 9F).

In the second case, instead of being output as is, the document image data Dm is corrected (re-clipped) in accordance with the document analysis data Da (step S160). Specifically, in step S160, an area where a character string is present in the document image data Dm is extracted in accordance with the document analysis data Da (in particular, the position data Dp), and resetting and re-clipping based on the resetting are performed on the edge positions (the leading edge position Pt, trailing edge position Pb, left edge position Pl, and right edge position Pr) such that the character string is contained. The resetting of edge position is desirably performed on all the four edge positions. As illustrated in FIG. 9F, at least two edge positions, namely, the left edge position Pl and right edge position Pr are desirably reset. The document image data Dm (see FIG. 9E) obtained by clipping on an area wider than the document M is thus re-processed into the document image data Dm for a smaller size (see FIG. 9F).

In the second case, the output data Do (see FIG. 9F) that is obtained by linking the document analysis data Da to the document image data Dm corrected in step S160 is transmitted to the server 2 in step S170. The series of operations is thus complete.

Modifications

If edges (the document left edge Ml and document right edge Mr) at both ends of the document M in the first scan direction FS are not found in step S60 in accordance with the exemplary embodiment, the left edge position Pl and right edge position Pr are determined based on the document width detection results of the document width detection sensors 20. The disclosure is not limited to this method. For example, ff the no path is followed in step S60, the read image data Ds may be transmitted to the OCR apparatus 3 and the left edge position Pl and right edge position Pr may be determined in accordance with the received document analysis data Da. In such a case, the document image data Dm is obtained by re-clipping the read image data Ds in accordance with the document analysis data Da.

If edges (the document left edge Ml and document right edge Mr) at both ends of the document M in the first scan direction FS are not found in step S60 in accordance with the exemplary embodiment, the left edge position Pl and right edge position Pr are determined based on the document width detection results of the document width detection sensors 20. The disclosure is not limited to this method. For example, determination criteria to be referred to may include size information on the document M (such as A4 portrait) received from the user and position information on the regulating members 18.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading apparatus comprising:
   a scanner that reads a document transported in a second scan direction;
   a sensor that detects a position of an edge of the document in a first scan direction crossing the second scan direction; and
   a processor, configured to:
      set a search range of the edge of the document in the first scan direction, the search range including the position of the edge detected by the sensor; and
      on image data that the scanner has read from the document, search for the position of the edge within the set search range of the edge.

2. The image reading apparatus according to claim 1, wherein the processor is further configured to:
   if the position of the edge has been found within the search range of the edge, perform data clipping on the read image data in accordance with the position of the edge found within the set search range of the edge.

3. The image reading apparatus according to claim 2, wherein if the processor has been unable to find the position of the edge within the search range of the edge, the processor performs data clipping on the read image data in accordance with the position of the edge detected by the sensor.

4. The image reading apparatus according to claim 3, wherein if the processor has been unable to find the position of the edge within the search range of the edge, the processor performs data clipping on the read image data in accordance with a position determined from the position of the edge detected by the sensor and a size of the document.

5. The image reading apparatus according to claim 3, wherein if the processor has been unable to find the position of the edge within the search range of the edge, the processor performs data clipping on the read image data in accordance with optical character recognition data that is obtained by performing an optical character recognition operation on the read image data.

6. The image reading apparatus according to claim 5, wherein the processor performs data clipping on the read image data outside an area surrounding a region where a character is present on the optical character recognition data.

7. The image reading apparatus according to claim 5, wherein a region where the optical character recognition is performed on the read image data is determined in accordance with a position of the document detected by the sensor.

8. The image reading apparatus according to claim 2, wherein if the processor has been unable to find the position of the edge within the search range of the edge, the processor performs data clipping on the read image data in accordance with optical character recognition data that is obtained by performing an optical character recognition operation on the read image data.

9. The image reading apparatus according to claim 8, wherein the processor performs data clipping on the read image data outside an area surrounding a region where a character is present on the optical character recognition data.

10. The image reading apparatus according to claim 8, wherein a region where the optical character recognition is performed on the read image data is determined in accordance with a position of the document detected by the sensor.

11. The image reading apparatus according to claim 1, further comprising a document feeder that transports the document in the second scan direction with reference to a central point of the document in the first scan direction,
   wherein the sensor detects as the position of the edge a position of a first edge of the document and a position of a second edge of the document in the first scan direction,
   wherein the processor sets, as the search range, a first search range including the first edge and a second search range including the second edge, and
   wherein the processor searches for the position of the first edge within the set first search range and the position of the set second edge within the second search range.

12. An image reading apparatus comprising:
   a document feeder that transports in a second scan direction documents stacked in a document platen;

a scanner that reads the documents transported in the second scan direction;

a sensor that selects a position of one of edges of plural types of documents stacked on the document platen and different in length in a first scan direction crossing the second scan direction; and a processor, configured to:
  set a search range of an edge in the first scan direction, the search range including the selected position of the edge; and
  on image data that the scanner has read from the documents, search for the position of the edge within the set search range of the edge.

13. A control apparatus for an image reading apparatus, comprising:
  a sensor that detects a position of an edge of a document in a first scan direction crossing a second scan direction, the document transported in the second scan direction; and
  a processor, configured to:
    set a search range of an edge of the document in the first scan direction, the search range including the position of the edge detected by the sensor; and
    on image data that has been read from the document transported in the second scan direction, search for the position of the edge within the set search range of the edge.

* * * * *